United States Patent [19]

Chase

[11] Patent Number: 4,593,355
[45] Date of Patent: Jun. 3, 1986

[54] METHOD OF QUICK BACK PROJECTION FOR COMPUTED TOMOGRAPHY AND IMPROVED CT MACHINE EMPLOYING THE METHOD

[75] Inventor: Richard C. Chase, Tewksbury, Mass.

[73] Assignee: American Science and Engineering, Inc., Cambridge, Mass.

[21] Appl. No.: 554,024

[22] Filed: Nov. 21, 1983

[51] Int. Cl.⁴ .................. G01T 1/16; H04N 5/32; G01N 23/00; G06G 7/60

[52] U.S. Cl. .................................. 364/414; 364/415; 358/133; 358/136; 378/901; 378/21

[58] Field of Search ............... 364/414, 415; 358/133, 358/136; 378/901, 98, 99, 21; 340/750, 749, 747, 723; 382/47, 55

[56] References Cited

U.S. PATENT DOCUMENTS

| | | | |
|---|---|---|---|
| 3,553,676 | 1/1971 | Raciti | 340/750 |
| 4,189,775 | 2/1980 | Inouye et al. | 378/901 X |
| 4,245,244 | 1/1981 | Lijewski et al. | 378/99 X |
| 4,349,739 | 9/1982 | Annis | 378/99 |
| 4,418,345 | 11/1983 | Demke et al. | 340/731 |

Primary Examiner—Jerry Smith
Assistant Examiner—Charles B. Meyer
Attorney, Agent, or Firm—Pollock, Vande Sande & Priddy

[57] ABSTRACT

Computer tomography employs quick back projection, allowing for example software based back projection in a minicomputer. From the line of sight absorption data which is normally taken for computed tomography, the apparatus generates additional data files of more limited resolution, the most limited resolution file has such resolution that software controlled back projection employed in the minicomputer can be completed in a period of time of one minute or less. Thereafter, the operator controls a cursor so that subsequent back projection, on files of higher resolution, employ only a subset of the available data to also limit the processing time.

22 Claims, 14 Drawing Figures

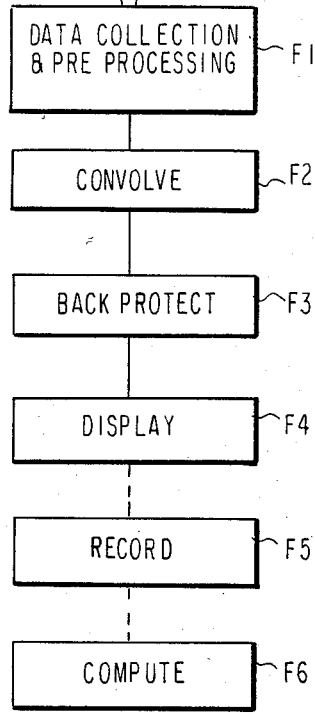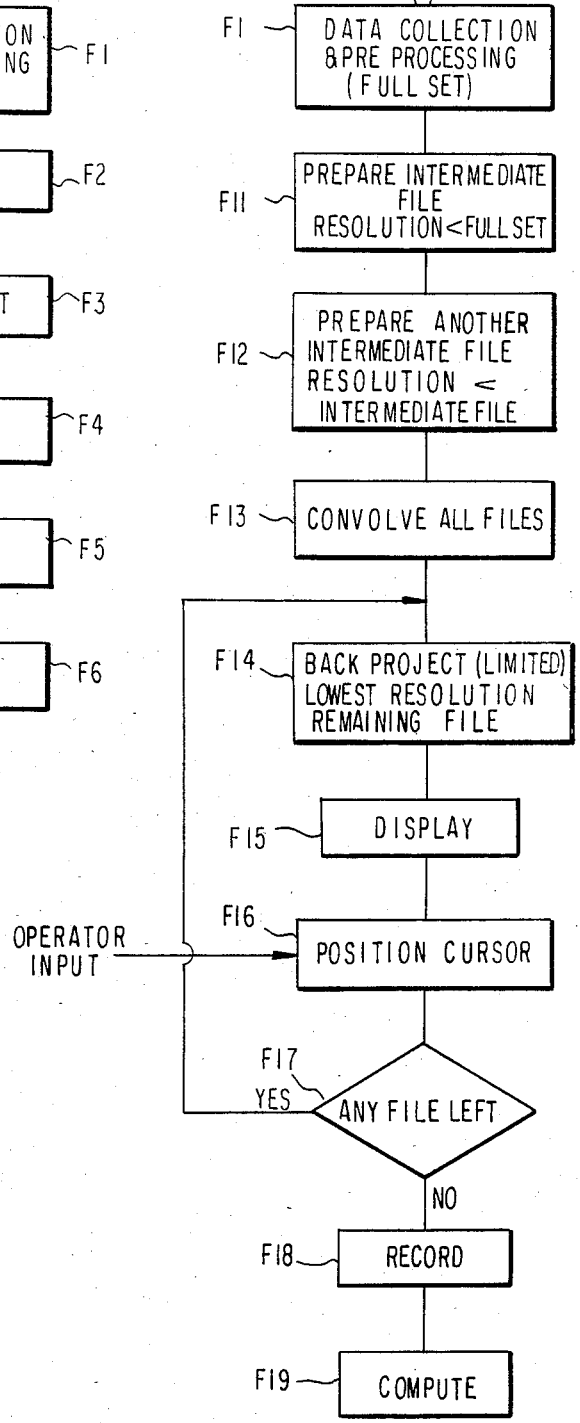

FIG. 11 FULL DATA SET (CONVOLVED)

| RAY # | 1 | 2 | 3 | 4 | 5 | 6 | 7 | 8 | 9 | 10 | 11 | ... | 512 |
|---|---|---|---|---|---|---|---|---|---|---|---|---|---|
| VIEW# | | | | | | | | | | | | | |
| 1 | $W_1^1$ | $W_1^2$ | $W_1^3$ | $W_1^4$ | $W_1^5$ | $W_1^6$ | $W_1^7$ | $W_1^8$ | $W_1^9$ | $W_1^{10}$ | $W_1^{11}$ | | |
| 2 | $W_2^1$ | $W_2^2$ | $W_2^3$ | $W_2^4$ | $W_2^5$ | | | | | | | | |
| 3 | | | | | | | | | | | | | |
| 4 | | | | | | | | | | | | | |
| 10 | | | | | | | | | | | | | |
| 11 | $W_{11}^1$ | $W_{11}^2$ | $W_{11}^3$ | $W_{11}^4$ | | | | | | | | | |
| 600 | | | | | | | | | | | | | |

FIG. 12 1st INTERMEDIATE DATA SET

| RAY # | 1 | 2 | 3 | 4 | ... | 128 |
|---|---|---|---|---|---|---|
| VIEW# | | | | | | |
| 1 | $X_1^1$ | $X_1^2$ | $X_1^3$ | $X_1^4$ | | |
| 11 | | | | | | |
| 21 | | | | | | |
| 31 | | | | | | |
| 41 | | | | | | |

$$X_1^1 = \Sigma \ W_1^1 + W_1^2 + W_1^3 + W_1^4$$

FIG. 13 2nd INTERMEDIATE DATA SET

| RAY # | 1 | 2 | 3 | 4 |
|---|---|---|---|---|
| VIEW# | | | | |
| 1 | $Y_1^1$ | $Y_1^2$ | $Y_1^3$ | $Y_1^4$ |
| 11 | | | | |
| 21 | | | | |
| 31 | | | | |
| 41 | | | | |

$$Y_1^1 = \Sigma \ W_1^1 + W_1^2 + W_1^3 + W_1^4 \cdots W_1^{16}$$

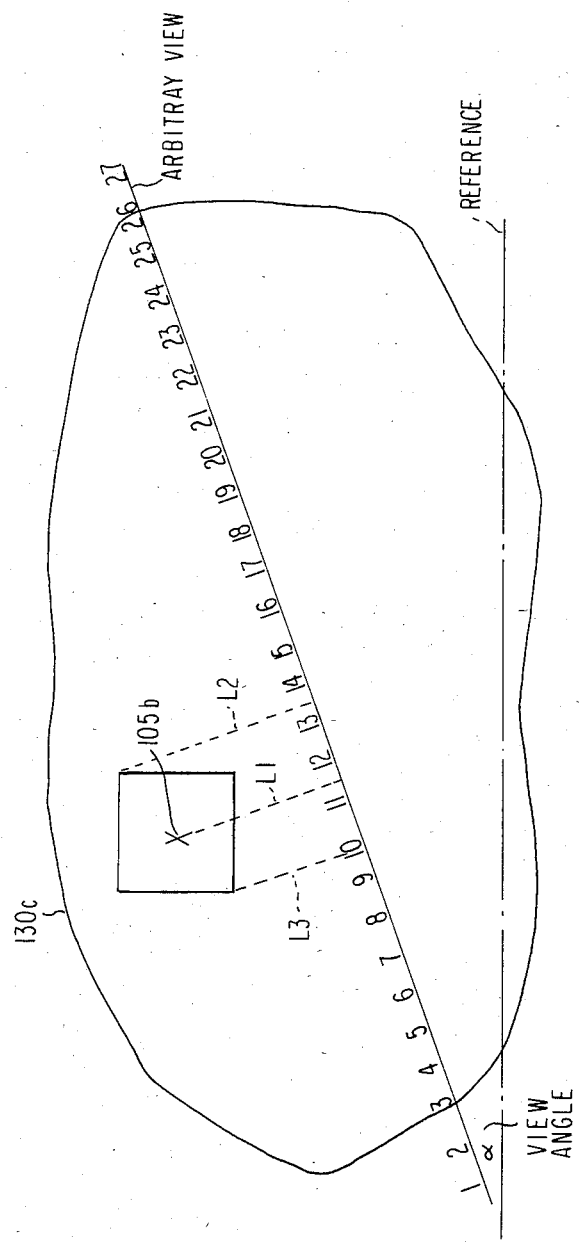

METHOD OF QUICK BACK PROJECTION FOR COMPUTED TOMOGRAPHY AND IMPROVED CT MACHINE EMPLOYING THE METHOD

DESCRIPTION

1. Technical Field

The present invention relates to radiological imaging, and more particularly, a new method of quick back projection for CT imaging and a machine employing the method for producing images useful in various diagnostic applications.

2. Background Art

The advantages to the medical industry provided by the advent of computed tomography (CT) have been well documented in the literature. The bundle of technology encompassed within the field of computed tomography has allowed the production of images which had previously been unobtainable. More particularly, computed tomography produces an image of a cross-section or "slice" of an object in a non-invasive manner. The basic components of computed tomography include a source of illuminating radiation (typically an x-ray beam) which is arranged to pass through the "slice" of the object at the plane of the desired cross-section. An apparatus for detecting the transmitted radiation provides line of sight absorption data from the slice of the object illuminated by the radiation. The illuminating radiation is moved relative to the object so as to provide illumination through the entire slice from a plurality of angles. Data derived from the detecting apparatus may be stored and then processed. Several different types of processing can be employed, the net result of the processing is the production of a map of the slice allocating x-ray attenuation data to individual regions (sometimes termed pixels) of the cross-section. This map can then be used to produce a display (either on a cathode ray tube, a hard copy print out or both) which produces an image displaying relative x-ray attenuation data for each of the different pixels in the slice. This relative x-ray attenuation data can also be transformed into absolute x-ray attenuation data through the use of an empirically determined relationship between the relative attenuation data and the absolute attenuation of some known material, e.g. a calibration curve.

Although the literature is widespread, a good understanding can be obtained from "Basic Principles of Computer Assisted Tomography" by Payne and McCullough appearing in *Applied Radiology*, March/April, 1976, pages 53 et seq; "Computerized Tomography: Taking Sectional X-Rays" by Swindell and Barrett, appearing in *Physics Today*, December 1977, pages 32 et seq; "Reconstructing Interior Head Tissue from X-Ray Transmissions" by Shepp and Logan appearing in the *IEEE Transactions on Nuclear Science*, February 1974, pages 228-236; "The Fourier Reconstruction of a Head Section" by Shepp and Logan appearing in *IEEE Transactions on Nuclear Science*, June 1974, pages 21 et seq. See also, for example, LeMay U.S. Pat. Nos. 3,924,129 and Lux 4,374,419.

The machines and technology available today provide a truly formidable array of capabilities; however, there are disadvantages. The mathematical operations required to be carried out on the data acquired during the scanning process are complex and time consuming. To meet practical requirements, it is not considered practical to allow a long period of time (e.g. many hours) for the mathematical operations to be performed. Therefore, in order to provide for relatively quick processing (no more than several minutes, for example), the equipment necessary has several significant drawbacks. In the first place, it is very expensive; this drawback limits the applications of computed tomography in those instances where the expense of using the equipment will produce information which is sufficiently valuable to justify the expense. A second, and equally significant drawback of this highly capable equipment, is the fact that in order to perform this prodigious computing, the computing process is, in the main, fixed in advance. That is, the equipment operator has little or no control over the computations being performed and therefore cannot adapt the processing to the particular diagnostic procedure at hand. In general, the equipment operator is limited to altering the manner in which the data, which has by this time already been processed, is displayed.

Because of these disadvantages, there are a number of diagnostic procedures which, although technically possible on available equipment, are simply not performed. For example, computed tomography can be employed to actually non-invasively measure the density of bone. This would be useful for routine screening of the disorder called osteoporosis. Another diagnostic procedure which could be employed on equipment using available technology but which in fact is not because of the expense, is routine screening for the discovery of lung tumors. By using computed tomography to measure absolute density of the suspected tumor, and also producing an image of the local area, routine screening for lung tumors could be effected.

More specifically, the computed tomography technology available today provides equipment which is capable of illuminating a region sufficient, for example, to cover the human torso, i.e. about 50 cm in diameter. Data collection is arranged to produce a plurality of views (for example 600) each of which consists of 512 rays; with these parameters, each pixel represents about a square millimeter. While data reduction could be effected using conventional minicomputers (for example the Data General Nova or Eclipse), the time for effecting back projection (one of the necessary but time consuming operations required) using this equipment on data representing 600 views with 512 rays per view, is on the order of 10 to 25 hours (specifically 10 hours for the Eclipse, 25.5 hours for the Nova). Because these times are considered unreasonably long, special purpose hardware is used to reduce the data processing time to something less than several minutes. While this produces images which are eminently usable in diagnostic procedures (resolution on the order of 1 mm), the fact of the matter is that it is unusual for the diagnostic procedure to require that resolution over the entire region of the human torso. More typically, that type of resolution is only required in a very limited region (perhaps 20×20 mm). Unfortunately, the particular region at which it would otherwise be desired to focus the power of the computing apparatus, is not known in advance. With present day technology, the equipment provides an image at this high resolution over the entire region of the cross-section.

Thus, it is one object of the present invention to improve data processing methods employed in computed tomography. It is another object of the present invention to improve this processing to enable more reasonably priced equipment to aid in diagnostic procedures whereby enabling more widespread application of computed tomography. It is another object of the present invention to provide a method of, and apparatus for, improved data processing in computed tomography which allows the equipment operator to focus the processing capabilities which are available to him, specifically in the region of interest, thereby allowing simpler equipment to perform the mathematical operations required for developing computer tomography images.

SUMMARY OF THE INVENTION

The invention meets these and other objects of the invention be providing a method of focusing much more limited computing power than is ordinarily used today, on the region of interest. By allowing such adaptation, the particular region of interest can be selected at will by the equipment operator during the course of the diagnostic procedure. A number of significant advantages accrue, reasonable processing time using the method of the invention are achieved with much more limited capability equipment. This reduces the overall cost of the process so that it has more widespread applicability.

While conventional computer tomography methods vary, they can be generically described as including one or more of the following six steps:

1. Illuminate the subject, collect the data and preprocess the data.
2. Perform a convolution function on the pre-processed data of step 1.
3. Back project the convolved data produced as a result of step 2.
4. Display the back projected, convolved data produced as a result of step 3.
5. As an option, the display data may be recorded for later review.
6. As a further option, either the displayed or recorded data can be used to compute absolute x-ray attenuation of any particular region or pixel of the cross-section.

In accordance with the present invention, after the first step of the prior art method, the data collected in the first step (sometimes referred to as a full set) is additionally pre-processed to produce one or more intermediate files. These intermediate files are derived from the data produced in the first step, and actually represent the same data at significantly less resolution. The number of such intermediate files produced can be varied depending upon the particular requirements; in a preferred embodiment of the invention two intermediate files are produced. For example, using the originally acquired data, e.g. 600 views with 512 rays per view, a first intermediate file is produced which has 60 views, 128 rays per view, and a second intermediate file is produced which has 60 views at 32 rays per view. In a preferred embodiment of the invention, the two intermediate files are assembled from every tenth view of the original file. In one case, for every tenth view selected, four rays of the original file are summed together to yield the first intermediate file with 60 views, at 128 rays per view. In the second intermediate file, every 16 rays (of every tenth view) are summed to yield a total of 32 rays for each of the 60 views. We can ascribe, to the first intermediate file, a resolution figure of about 4 mm per pixel, and to the second intermediate file a resolution of about 1.6 cm per pixel. Thus, the data collection and pre-processing step of the invention produces one or more intermediate files containing data at a lower resolution than the full set.

The next step in accordance with the invention is similar to the prior art in that the collected data is convolved; whereas in the prior art only a single convolved data set is produced, in accordance with the present invention, at least two convolved data sets are produced. More specifically, a convolved data set is produced for the original file (the full set) and for each intermediate file.

The next step in accordance with the invention is back projection, although in the case of the invention the back projection is very limited, using the lowest resolution file available. Because of the low resolution of the data, the data processing required for the back projection has sufficiently relaxed requirements so that a minicomputer (e.g. the Data General Nova or Eclipse) can readily perform the back projection in a reasonable amount of time; particularly, the back projection can be performed in a time which is significantly less than one minute. Thereafter, the resulting back projected data is displayed, for example on a cathode ray tube. Because of the coarse resolution of the back projected data, the result is a coarse mesh map of relative absorption data. In the next step in accordance with the invention, the operator positions an operator controllable cursor on the cathode ray tube at a region of interest. With this selection of the region of interest, data is again back projected, however this second back projection is effected on a file of higher resolution, although limited in extent. The cursor selects a region which is smaller than the region described by the entire file. The higher resolution file requires more time for back projection; however, limiting the data employed to that data relevant to the region of interest results in very short back projection times even with software based processing. In some embodiments of the invention, this limited back projection can be effected using the full set of data. In a preferred embodiment of the invention, however, data which is back projected at this point is still of more limited resolution than the full set of data. Thereafter, the resulting back projected data is displayed. If this does not produce an image of the desired resolution, the steps of repositioning the cursor, limited back projection and display can be effected on data sets of increasing resolution. At some point in this process, the limited back projection is effected on the full set of data and the display provides the required information in that it produces a fine mesh map of relative absorption data corresponding to the fine resolution of the full set data.

Thus, prior to the first back projection, the line of sight absorption data available to the back projecting apparatus consists of one or more data sets. One data set is the full set, e.g. similar to that available to prior art back projecting processing apparatus. However, there is at least one or more intermediate files which are of more limited resolution. The first back projection process is effected on the lowest resolution file, and the parameters of the file are chosen so that software based back projection (using either of the above-mentioned minicomputers, or equivalents) can be effected in reasonable times (on the order of a minute or less). The result of this initial back projection is a coarse mesh map of the slice, usually the mesh is so coarse that the resolution will be limited to the extent that the display may not even be usable for diagnostic purposes. However, the display is of sufficient resolution for the operator to identify a region of interest, and the equipment allows him to position a cursor to identify that region of interest. Thereafter, back projection is again effected, although this time on a file of higher resolution. In order to reduce the time required for processing, this second or subsequent back projection is effected on a data file of higher resolution, but not all the data is employed. The back projecting process is actually effected only on the data which is pertinent to the region of interest. The center of the region of interest is defined by the cursor location, the extent of the region of interest may typically be fixed (although it is possible to allow the operator to select the area of this region of interest).

The convolved data on which the second or subsequent back projection is effected, is addressable via two parameters, the view (that is, the angle at which the data was taken) and the offset (the distance from some origin of the particular line of sight, e.g. the ray number). Typically, the back projection process will select some of the rays from each view for processing, however, the identity of the particular rays in each view which are selected may vary, and the selection process proceeds as follows.

The line of sight absorption data derived from any view can be considered as distributed lying along a line through the cross-section, the line making an angle with some frame of reference which is related to the angle at which the view was taken. Accordingly, we can map the line of sight absorption data from 60 views to lie along a set of 60 lines (each line making an angle of 6° with adjacent lines). The location of the operator positioned cursor also can be related to this map. To address or select the data required for back projection, the back projection process conceptually draws a perpendicular from the cursor location to each line. This identifies, along the line, the center of the data which will be employed. The extent, along the line, of data which will be employed depends on the extent of the region of interest. In this fashion, the back projection process can select from a higher resolution file that portion of the data which will be employed in back projection.

It is significant in accordance with the invention that each limited back projection is effected on data sets of increasing resolution. Because each limited back projection may use a fixed pixel count, the region of interest (the area of the object being imaged encompassed by the display) continuously decreases as the resolution becomes finer and finer. However, although resolution continually increases, the processing required is significantly more time consuming than the original limited back projection on the coarse resolution data. As a result, the time required for limited capability processing equipment (such as the Nova or Eclipse minicomputers) remains sufficiently short so as to render software based back projection practical. The entire process of back projection, display, cursor location may be reiterated a number of times with the entire process consuming significantly less than several minutes.

The invention therefore provides a method of imaging comprising the steps of:

detecting line of sight absorption data from a slice of an object illuminated by sets of line of sight x-rays, each said set angularly displaced from other sets, storing said line of sight absorption data, transforming said stored data into a coarse mesh map of elemental relative absorption data corresponding to a cross-section of said object consisting of said slice, displaying an image representing said map, selecting a region of said image significantly smaller in dimensions than said image, for further processing, transforming portions of said stored data into a fine mesh map of elemental relative absorption data corresponding to the reduced portion of said image identified in a preceding step, and displaying an image representing said fine mesh map.

Alternatively, the invention provides a method of image processing on plural sets of line of sight absorption data, each set taken at an angle to other sets to produce a display representing elemental relative absorption data, said method comprising the steps of:

transforming said data with a mesh over a cross-section of an object from which said data was derived to produce a display representing elemental relative absorption data, said mesh having a number of elements too few, when considered in relation to said cross-section to produce a display of immediately useful resolution, selecting, in said display, a region of said display significantly smaller in area than said cross-section, transforming portions of said data with a fine grid mesh to produce a further display representing elemental relative absorption data, whereby said significantly smaller area of said region taken together with the number of elements in said mesh results in said further display with immediately usable resolution.

Of course, there is a relation between the resolution and area represented in the display. With coarse resolution, a large area can be represented—with fine resolution a smaller area is represented. This affords the convenience of back projecting with limited processing power.

The invention can readily be applied with American Science and Engineering's Model 1500 Medical Micro-Dose ® System. The Model 1500 is described, for example, in co-pending Swift Application Ser. No. 395,943, now U.S. Pat. No. 4,472,822. The Model 1500 includes a pair of vertically oriented columns on which are respectively mounted an x-ray source and detector. A rotary table is located between the columns for supporting a patient. The table is first translated vertically relative to the source/detector (without rotation) to produce a standard chest image of the patient. Signals from the detector are provided to a minicomputer which can produce a CRT display corresponding to a standard chest image. This allows the equipment operator to locate, for example the suspected tumor site and the plane of the x-ray source is automatically and precisely adjusted to pass through the tumor. Now, the table is rotated 360° at this vertical elevation, the rotation time of the table is less than one minute. The data collected during table rotation is used to produce the full set of line of absorption data as well as one or more intermediate files with reduced resolution. All data sets are convolved. The convolved data set of lowest resolution is now back projected and displayed. A coarse mesh, e.g. 20×20 pixels is used to cover the entire patient cross-section, allowing back projection by the minicomputer to be effected in significantly less than one minute. The operator then positions the cursor in the region of the suspected tumor site and the minicomputer effects a second back projection on a finer resolution data set. The loop of back projection, display and cursor positioning can be repeated on different finer resolution data sets, until the final CT image is a high resolution 20×20 pixel image of the suspected tumor.

At this point, absolute x-ray attenuation can be computed from the CT image in a conventional manner by positioning the cursor over the CT image at which absolute attenuation computation is desired. As should be apparent, a similar technique can be used for measuring absolute x-ray attenuation of the patient's backbone for osteoporosis screening, as well as for other diagnostic procedures.

Accordingly, the invention provides apparatus for imaging comprising:

means for detecting line of sight absorption data from a slice of an object illuminated by sets of line of sight x-rays, each set angularly displaced from other sets, means for storing said line of sight absorption data, means for transforming said stored data into a coarse mesh map of elemental relative absorption data corresponding to a cross-section of said object consisting of said slice, means for displaying an image representing said map, means for selecting a region of said image significantly smaller in dimension than said image for further processing, means for transforming portions of said stored data into a fine mesh map of elemental relative absorption data corresponding to the reduced portion of said image identified by said means for selecting a region, and means for displaying an image representing said reduced map.

BRIEF DESCRIPTION OF THE DRAWINGS

The present invention will now be further described in the following portions of this specification to enable those skilled in the art to practice the same when taken in conjunction with the attached drawings in which like reference characters identify identical apparatus and in which:

FIG. 5 is a flow diagram of one form of data processing employed in prior art CT systems;

FIG. 6 illustrates a flow chart embodying the present invention;

FIGS. 11-13 illustrate the make-up of three different data sets employed in the preferred embodiment of the present invention; and FIG. 14 is useful in explaining the manner in which ray data is selected for the second and subsequent back projection steps.

DETAILED DESCRIPTION OF PREFERRED EMBODIMENTS

Figure 1:
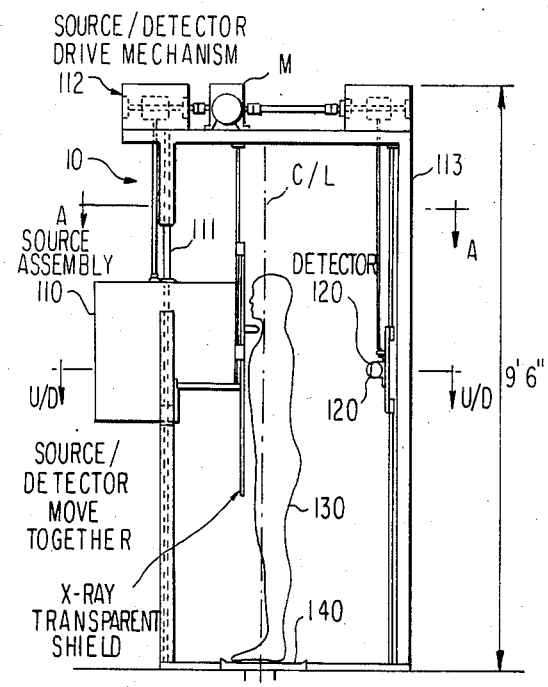
FIGS. 1 and 2 are respectively elevation and section views of AS&E's Model 1500 Medical Micro-Dose ® x-ray system which can be employed with the present invention.

As is well known in the CT field, the data which must be taken to provide the desired image corresponds to line of sight absorption data from a slice of an object illuminated by sets of line of sight x-rays, each set angularly displaced from other sets. Apparatus which can be used to obtain this data is shown in FIGS. 1-4. More particularly, and referring to FIG. 1, an elevation of AS&E's Model 1500 Medical Micro-Dose ® x-ray system is shown. In this system, which is identified by reference 10, an x-ray illumination source assembly 110 is supported for up/down motion on a column 111. Similarly, a suitable x-ray detector 120 is supported for like motion on a parallel column 113. Motion is imparted to the source assembly 110 and detector 120 via mechanical couplings with a source-detector drive mechanism 112 driven by a motor M. A patient (indicated in outline form at reference character 130) stands on a rotatable table 140, rotating about a line C/L. FIG. 2 is a section (taken on the line A—A) wherein the origin 110A of the fan beam emitted by the source assembly 110 is illustrated in relation to the position of the patient 130. As is apparent from FIG. 2, the geometry is arranged such that the fan beam is capable of illuminating an entire swath at any elevation of the patient, and the detector assembly 120 can respond throughout the entire angular extent of the x-ray fan beam.

By positioning the source assembly 110 (and concomitantly the detector assembly 120) at any desired vertical position, the slice of the patient 130 which will be illuminated can be selected at will. The apparatus which responds to signals emitted by the detector assembly 120 will be described below.

As is typical in computed tomography systems, the mechanical and electronic components must be rigidly synchronized. The motion of the patient should be such that the center line of the motion is maintained within the same pixel of each fan, e.g. the axis of rotation of the platform must not move with respect to the source slit and chopper wheel. Furthermore, the timing the data sampling is stable with reference to the chopper slit position; however, these requirements are readily satisfied.

Figure 3:
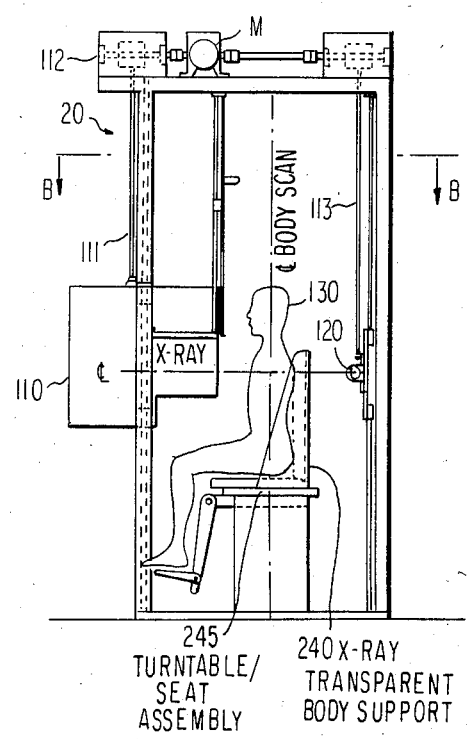
FIGS. 3 and 4 are respectively elevation and sections of AS&E's Model 2000 Medical Micro-Dose ® x-ray system with which the present invention can be employed.
Figure 2:
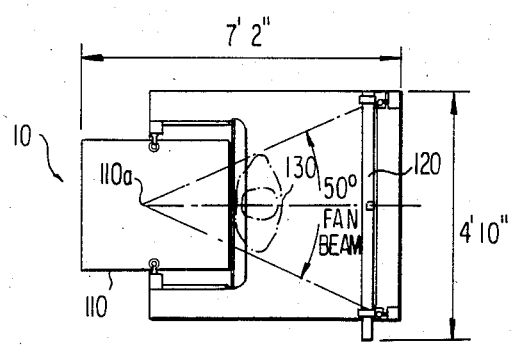
Figure 4:
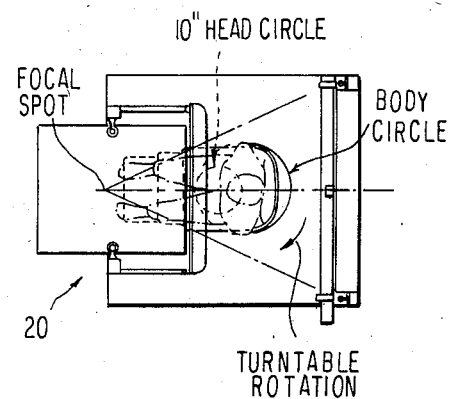

FIGS. 3 and 4 are similar to FIGS. 1 and 2 except that they are related to the AS&E Model 2000 Medical Micro-Dose ® x-ray system. This system is in many respects similar to the Model 1500, a significant difference is that the patient 130, rather than standing on a rotatable platform 140 is supported for rotational movement on a turntable seat assembly 245. The section, which is FIG. 4, is taken on the lines B—B of FIG. 3.

In typical operation, the operator moves the source assembly 110 and detector assembly 120 in the vertical direction while monitoring a display (not illustrated in FIGS. 1-4); the patient 130 is stationary during this scan. The display illustrates a representation of a typical x-ray shadow graph, and from this information the operator may select the desired vertical height for the source assembly 110 and detector assembly 120 so as to illuminate a particular horizontal slice of the patient 130. The source assembly 110 and detector assembly 120 is thus moved to the desired vertical position. Thereafter, the patient 130 is rotated about the center line and the x-ray source assembly 110 is again energized. The signals produced by the detector assembly 120 correspond to line of sight absorption data from the selected slice of the patient, which slice is illuminated by sets of line of sight x-rays, each set angularly displaced from other sets. As will be described hereinafter, this data is processed to produce the desired cross-sectional image of the patient at the selected slice.

Figure 7:
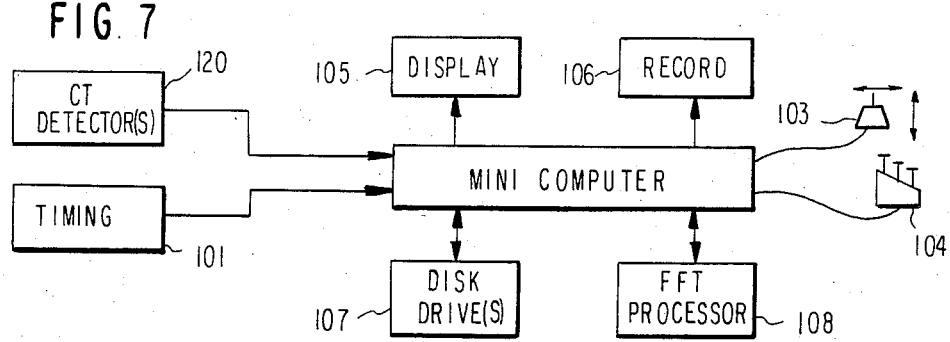
FIG. 7 is a block diagram of the electronic apparatus employed with either the Model 1500 or the Model 2000 in order to implement the invention.

Referring briefly to FIG. 7, a block diagram of a system embodying the invention is illustrated. As shown, the hub of the system is a minicomputer 100, this may comprise a Data General Nova, Eclipse, or other similar minicomputer. The minicomputer 100 is arranged to respond to input signals from the CT detector assembly 120 and a timing source 101, all in a manner conventional in the art. The minicomputer 100 may be associated with disk drive(s) 107 for input/output operations in a manner to be described, and an FFT processor 108 (the purpose for which will be described in more detail hereinafter). In addition, outputs of the minicomputer 100 can be provided to a display 105 (which can be a conventional cathode ray tube) and a record device 106 which, for example, can be a graphics plotter. Additional input devices coupled to the minicomputer 100 can comprise a joystick 103 which is used for control of a cursor on the display 105, also in a manner conventional in the art. In addition, FIG. 7 illustrates a further input device comprising a keyboard 104. As is apparent to those skilled in the art, the joystick 103 may in fact be eliminated and its function being performed by selected keys in the keyboard 104 as is also conventional.

FIG. 5 includes an illustration of prior art data processing employed in the CT field. As data is collected by the minicomputer, it is stored for later processing. In addition, some types of pre-processing may be performed to normalize the data, etc.

The image processing necessary to produce the desired cross-section the display is effected by functions F2 and F3, e.g. convolution and back projection. These functions are described more particularly in the Payne et al and Swindell et al publications cited above.

Following back projection, the cross-section can be displayed (function F4). At this point, the operator can merely visually review the display, produce a hard copy record (function F5) and/or employ the data generating the display to compute the absolute x-ray attenuation of any particular locality included in the cross-section (function F6).

While the functions shown in FIG. 5 are well within prior art capabilities, the back projection (function F3) for the data typically taken for a single cross-section (at least several hundred views and at least several hundred rays per view) is a very computation intensive process. As explained above, it is generally believed necessary to complete the processing and provide the display in a short enough period of time so that the patient will be available for further imaging if that is desired for any reason. This generally limits the processing time allowed to something on the order of several minutes or less. A minicomputer such as the Data General Nova or Eclipse, on the other hand, with a quantity of data which is typically taken, requires from 10 to 25 hours to effect the back projection (this is typical of software based back projection). Accordingly, it has been typical of the prior art to provide special purpose equipment to effect the back projection in a significantly shorter period of time, e.g. several minutes (this is typical of hardware back projection). As is explained above, it is one of the objects of the invention to eliminate the necessity for this expensive equipment, and provide for adaptive computation. The invention will not replace the necessity for this special purpose hardware, but it will allow several diagnostic procedures to be employed using simpler and thus more inexpensive hardware. The expensive hardware back projection apparatus will still be required in the event that a high resolution display of the entire cross-section is necessary. The inventive apparatus provides a high resolution display of a much more limited region of the cross-section.

In accordance with the invention, the processing takes the form shown in FIG. 6. As shown in FIG. 6, the first function, e.g. the data collection and pre-processing, proceeds as in the past. Inasmuch as the processing of FIG. 6 will produce several data sets, we will refer to the data set produced by function F1 as a full set. Thereafter, function F11 prepares an intermediate file which carries resolution less than the full set. Preferably, this intermediate file is prepared to have less than the number of views in the full set, in a particular embodiment of the invention, the 600 views in the full set is reduced to 60 views, e.g. one view out of ten is employed. Furthermore, the number of rays per view is also reduced, e.g. by four to one. However, in the case of the ray reduction, rather than throwing out any rays, the 512 rays of each view are broken up into four ray subsets, each of which are summed to produce a single ray. This produces an intermediate file (prepared at function F11) consisting of 60 views, 128 rays per view.

Thereafter, function F12 prepares still another intermediate file with resolution less than the file prepared at function F11. This file can be prepared similar to the first intermediate file (function F11) by using every tenth view. For preparation of this file, the 512 rays per view are divided into subsets of 16, and each subset is summed to provide a different ray; accordingly, the file produced at function F12 has 60 views, 32 rays (512/16) per view.

Function F13 effects a convolution of all the files. This convolution can be similar to the function F2. Rather than burdening the minicomputer with this convolution, FIG. 7 illustrates the FFT processor 108 which is provided to effect this convolution. There are special purpose machines available on the market for performing this function, e.g. MSP-2 from Computer Design and Applications, Inc., or equivalent devices can be provided to rapidly effect the convolution. The result of function F13 is three convolved files corresponding to the full set (function F1) and first and second intermediate sets (functions F11 and F12, respectively). It should be understood that the use of FFT processor 108 is not essential to the invention, although some provision must be made to effect the convolution function.

Thereafter, function F14 effects a back projection of the lowest resolution file. As indicated above, back projection using the minicomputer would take an inordinately long period of time. However, with this low resolution file (60 views, 32 rays per view), we can effect the back projection using the Data General Nova or Eclipse very rapidly, for example I estimate that the Nova could effect the back projection in 14 seconds and the Eclipse could effect the back projection in 5.5 seconds. The back projection is imposed on a relatively coarse mesh (for example a 20×20 pixel image). This provides, in effect, a coarse map of elemental relative absorption data corresponding to a cross-section of the object consisting of the slice. I refer to this as a coarse mesh since each file corresponds to the entire slice of the subject (for example 50 cm in diameter) and producing an image of 20 pixels × 20 pixels over 50 cm is indeed a coarse mesh. With a mesh of these dimensions (where each pixel is a square 2½ cm on a side) the mesh has a number of elements which are too few when considered in relation to the cross-section (e.g. 50 cm) to produce a display of immediately useful resolution.

Thereafter, the resulting back projection data is displayed at function F15.

At function F16, the operator positions a cursor on the display.

Figure 8:
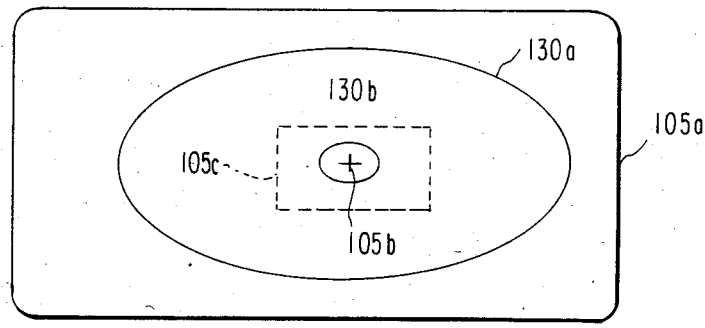
FIGS. 8, 9 and 10 are illustrations of the different displays that can be presented by the apparatus shown in FIG. 7 when employing the present invention.

Referring briefly to FIG. 8 which schematically represents the typical display, the face of the display 105a illustrates a cross-section 130a of the patient. Particular features shown in the display are the patient's spinal column 130b. The operator, using either the joystick 103 or the keyboard 104 (see FIG. 7) positions the cursor 105b at a region of interest. As will be described hereinafter, the further processing is centered on a region whose center corresponds to the cursor position and which is significantly smaller than the display itself, for example a dotted line 105c. (It should be understood that the display may not illustrate this dotted region 105c.)

Function F17, once the cursor is positioned and the operator so indicates, determines if any files are left. Since we have only back projected the lowest resolution file, the processing loops back to function F14 where the lowest resolution remaining file (in this case the first intermediate file) is now processed. While this file too is of more limited resolution than the full set (60 views at 128 rays per view), the back projection effected at function F14 on this pass will employ only a subset of the data in the file. The subset is selected depending on the cursor position and corresponds to that data representing the region within the dotted rectangle 105c. Because the first intermediate file is of limited resolution, and further because the data which is employed in the back projection is a limited subset of the entire file, the processing time for this back projection should be similar to the processing times given for back projecting the second intermediate file, e.g. 5–14 seconds, for example.

FIG. 14 is a graphic illustration of the manner in which the back projection process selects the subset of convolved data from any view which is to be used in the back projection, on the basis of the cursor positioning. FIG. 14 shows an outline 130c corresponding to the patient cross-section, and in relation thereto an arbitrary position of the cursor 105b. Superimposed on these elements which an operator would see on a display, is a first line designated arbitrary view, and a second line designated reference, and the angle $\alpha$ between these two lines is related to the view angle of the arbitrary view being represented. This particular angle can be used by the back projection process to select or address the convolved line of sight absorption data corresponding to the arbitrary view. The different rays related to the arbitrary view can be conceptualized as being evenly distributed along the line representing the arbitrary view; for illustrations purposes FIG. 14 illustrates rays 1 through 27. In order to limit the time consumed in the back projection process, the back projection processing mechanism must have a technique for selecting a subset of the ray data for each arbitrary view on which the back projection process will be effected. FIG. 14 shows that a perpendicular has been dropped from the cursor 105b to the arbitrary view, and that perpendicular is identified as L1. This locates the center of the data which will be employed in the back projection, and as shown in FIG. 14, that corresponds to ray 12. The back projection process then uses one or more words centered on this word 12, the extent of the words employed depend on the extent of the region of interest. The extent of the words employed can be determined as shown in FIG. 14 by dropping two additional perpendiculars L2 and L3 to identify the additional rays to include rays 10, 11 and 13. It should be apparent that programming to effect these functions is well within ordinary skill and is not further described herein. It should be understood, of course, that the operations described for the particular arbitrary view to select rays 10–13 for back projection processing, are repeated for each additional view in the particular file being back projected.

Figure 9:
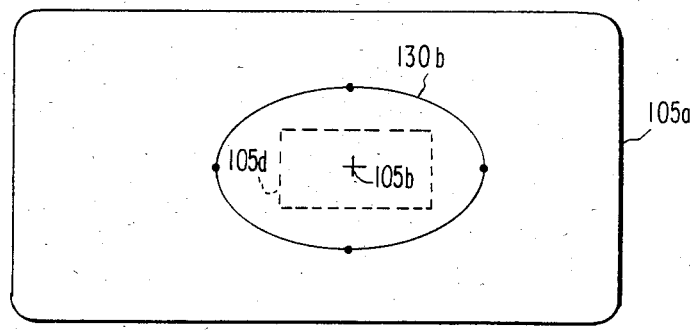

After the back projection, function F15 displays the resulting image. FIG. 9 is a schematic illustration of such a typical image. As shown, the display shows the patient's spinal column 130b. Comparing FIGS. 8 and 9, it is apparent that the display of FIG. 8 has been magnified because the limited region 105c now fills the entire display. At function F16 now, the operator can reposition the cursor 105b if, for example, there is particular interest in a specific region.

Once that function is effected, function F17 checks to see if any files are left. In our example, there is still one file left that is the full set, and therefore processing loops back to function F14 to back project this data.

While this back projection is on the high resolution data, we are only going to be back projecting a limited portion or subset of the data, e.g. that subset corresponding to the region within the dotted line 105d of FIG. 9. The subset of the full set of data which is employed in this back projection process is selected in the same fashion as shown in connection with FIG. 14.

Figure 10:
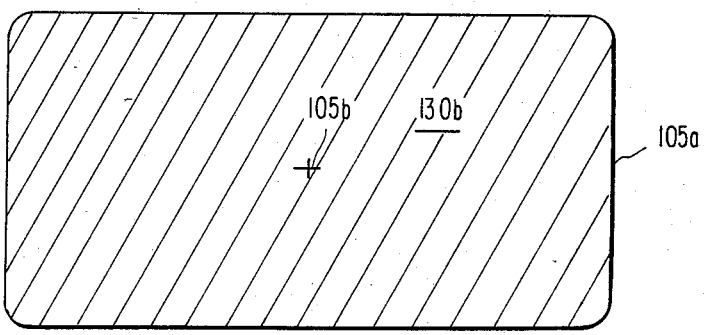

The result of this back projection is then displayed at function F15, and FIG. 10 is an illustration of that display. Comparing FIGS. 9 and 10, it is apparent that the display of FIG. 10 is limited to a region entirely within the patient's spinal column 130b.

Thereafter, the operator can position the cursor F16 as desired. When that process is completed, function F17 checks to see if there are any files left, in this case there are none, therefore functions F18 and 19 can be performed to produce a hard copy record and/or compute the absolute attenuation data in the region identified by the cursor 105b.

FIGS. 11–13 illustrate the relation between the data sets, e.g. the full data set (function F1), the first intermediate data set (function F11) and the second intermediate data set (function F12). As shown in FIG. 11, the data can be arranged in a matrix wherein there are 512 rays for each of 600 views. This provides something over 300,000 words (one for each ray in each view). In going from the full set to the first intermediate data set, every tenth view is selected, e.g. views 1, 11, 21, etc., through 511, for a total of 60 views, and as indicated in FIG. 12, there are now 128 rays per view, giving us a total of 7,680 words. Each word for example $x_1^1$ (where the superscript refers to the ray number and the subscript refers to the view number, with the view numbers identifying the view of FIG. 11) is the sum of four rays in the full set, e.g. $x_1^1$ is the sum of $w_1^1$, $w_1^2$, $w_1^3$ and $w_1^4$. Likewise, $x_1^2$ is the sum of $w_1^5$, $w_1^6$, $w_1^7$ and $w_1^8$.

FIG. 13, the second intermediate data set, is similar to the first intermediate data set in that it includes the same 60 views, e.g. every tenth view from the full set. However, the number of rays per view is still further reduced. Whereas each word in the first intermediate data set was the sum of four rays in the full set, in the second intermediate data set, each word is the sum of 16 rays in the full set.

Since we are going to impress each of the data files (the full set, the first and second intermediate sets) on a 20×20 pixel mesh, the result is that each pixel from the second intermediate set represents about 1.6 cm, each pixel in the first intermediate set represents about 4 mm and pixel in the full set represents about 1 mm.

The following table summarizes the parameters of the three different images illustrated in FIGS. 8, 9 and 10.

| Convolved Data Size (Views × Rays) | Image Size in Pixels | Absolute Image Size | Image Center | Estimated Back Project Time on Nova Minicomputer |
|---|---|---|---|---|
| 60 × 32 | 20 × 20 | Approx. 50 × 50 cm | Entire Field | 14 seconds |
| 60 × 128 | 20 × 20 | Approx. 12.5 × 12.5 cm | On cursor | 14 seconds |
| 600 × 512 | 20 × 20 | Approx. 20 × 20 mm | On cursor | 140 seconds |

It should be apparent to those skilled in the art that various modifications can be made within the spirit and scope of the invention. For example, there is no reason that the minicomputer need be a Data General Eclipse or Nova, there are in fact many other minicomputers which are usable; in addition, as the microcomputers become more and more capable, it may be that sufficient processing power will be found in a microcomputer. The specification describes an example in which the invention employs two intermediate files. The number of intermediate files to be employed depends on a variety of factors and the invention embraces the use of one or more intermediate files as described. Furthermore, the manner in which each intermediate file is derived is not necessarily limited to the example described above. The view reduction can be greater or less than 10 to 1, and the ray reduction is of course not limited to 4 to 1 and 16 to 1. It is of course important to the invention that in proceeding from limited resolution to finer resolution displays, the absolute area represented on the display decreases, however there is no reason why this "magnification" need be the same between the first two images (FIGS. 8–9) and the second (FIGS. 9–10). Furthermore, although it simplifies the system, there is no reason that the pixel count need be the same in the different displays.

I claim:

1. A method of imaging comprising the steps of:
   a. detecting line of sight absorption data from a slice of an object illuminated by sets of line of sight x-rays, each said set angularly displaced from other sets,
   b. storing said line of sight absorption data,
   c. transforming said stored data into a coarse mesh map of elemental relative absorption data corresponding to a cross-section of said object consisting of said slice,
   d. displaying an image representing said map,
   e. selecting a region of said image significantly smaller in dimensions than said image, for further processing,
   f. transforming portions of said stored data into a fine mesh map of elemental relative absorption data corresponding to the reduced portion of said image identified in step (e), and
   g. displaying an image representing said reduced map.

2. The method of claim 1 wherein step (c) includes:
   i. deriving at least one additional file from said stored data in which said additional file includes data at a lower resolution than said stored data,
   ii. convolving said stored data as well as data in each said additional file, and
   iii. back projecting data from at least one said additional file to produce said coarse mesh map of elemental relative absorption data corresponding to a cross-section of said object consisting of said slice.

3. The method of claim 1 in which said step (f) comprises:
   i. back projecting a portion of said stored data corresponding to said region to thereby produce a fine mesh map of elemental relative absorption data.

4. The method of claim 1 wherein said line of sight absorption data stored in said step (b) consists of M views, each with N rays, and wherein said step (c) includes the step of:
   i. producing an intermediate file having a number of views R, each including S rays, wherein M is greater than R and N is greater than S.

5. The method of claim 4 in which said producing step includes selecting only one view of a first number of views wherein said first number is equal to a ratio of M/R and producing S rays per view by summing a second number of adjacent rays of each selected view wherein said second number is a ratio of N/S to produce said S rays of said selected views.

6. The method of claim 5 wherein said R views are evenly distributed among said M views.

7. A method of image processing on plural sets of line of sight absorption data, each set taken at an angle to other sets to produce a display representing elemental relative absorption data, said method comprising the steps of:
   a. transforming said data with a mesh over a cross-section of an object from which said data was derived to produce a display representing elemental relative absorption data, said mesh having a number of elements too few, when considered in relation to said cross-section to produce a display of immediately useful resolution,
   b. selecting, in said display, a region of said display significantly smaller in area than said cross-section,
   c. transforming portions of said data with a fine grid mesh having a number of elements to produce a further display representing elemental relative absorption data,
   d. whereby said significantly smaller area of said region taken together with the number of elements in said fine grid mesh results in said further display with immediately usable resolution.

8. The method of claim 7 wherein said step (a) includes:
   i. deriving at least one additional file from said sets of line of sight absorption data in which said additional file includes data at a lower resolution than said plural sets of line of sight absorption data,
   ii. convolving said stored data as well as said data in said additional file, and
   iii. back projecting data from said at least one additional file to produce said display representing elemental relative absorption data, said display having a number of elements too few, when considered in relation to said cross-section to produce a display of immediately useful resolution.

9. The method of claim 7 wherein said line of sight absorption data consists of M views, each with N rays, and wherein said step (a) includes the step of:
   i. producing an intermediate file having a number of views R, each including S rays, wherein M is greater than R and N is greater than S.

10. The method of claim 9 in which said producing step includes selecting only one view of a first number of views wherein said first number is equal to a ratio of M/R and producing S rays per view by summing a second number of adjacent rays of each selected view wherein said second number is a ratio of N/S to produce said S rays of said selected views.

11. The method of claim 10 wherein said R views are evenly distributed among said M views.

12. Imaging apparatus including:
   means for detecting line of sight absorption data from a slice of an object illuminated by sets of line of sight x-rays, each set angularly displaced from other sets,
   means for storing said line of sight absorption data,
   means for first transforming said stored data into a coarse mesh map of elemental relative absorption data corresponding to a cross-section of said object consisting of said slice,
   means for displaying an image representing said coarse mesh map,
   means for selecting a region of said image significantly smaller in dimensions than said image for further processing,
   means for further transforming portions of said stored data into a fine mesh map of elemental relative absorption data corresponding to the region of said image identified by said means selecting a region, and
   means for displaying an image representing said fine mesh map.

13. The apparatus of claim 12 in which said means for first transforming includes:
   means for deriving at least one additional file from said stored data in which said additional file includes data at a lower resolution than said stored data,
   convolving means for convolving said stored data as well as data in each said additional file, and
   back projecting means for back projecting data from at least one said additional file to produce said coarse mesh map of elemental relative absorption data corresponding to a cross-section of said object consisting of said slice.

14. The apparatus of claim 12 in which said means for further transforming comprises:
   means for back projecting a portion of said stored data corresponding to said region to thereby produce a fine mesh map of elemental relative absorption data.

15. The apparatus of claim 12 wherein said line of sight absorption data produced by said means for detecting consists of M views, each with N rays, and wherein said means for first transforming includes:
   means for producing an intermediate file having a number of views R, each including S rays, wherein M is greater than R and N is greater than S.

16. The apparatus of claim 15 in which said means for producing includes means for selecting only one view of a first number of views wherein said first number is equal to a ratio of M/R and producing S rays per view by summing a second number of adjacent rays of each selected view wherein said second number is a ratio of N/S to produce said S rays of said selected views.

17. The method of claim 16 wherein said R views are evenly distributed among said M views.

18. Apparatus for image processing on plural sets of line of sight absorption data, each set taken at an angle to other sets to produce a display representing elemental absorption data, said apparatus comprising:
   a. means for first transforming said data with a mesh over a cross-section of an object from which said data was derived to produce a display representing elemental relative absorption, said mesh having a number of elements too few, when considered in relation to said cross-section to produce a display of immediately useful resolution,
   b. means for selecting, in said display, a region of said display significantly smaller in area than said cross-section,
   c. means for further transforming portions of said data with a fine grid mesh having a number of elements to produce a further display representing elemental relative absorption data,
   whereby said significantly smaller area of said region taken together with the number of elements in said fine grid mesh results in said further display with immediately usable resolution.

19. The apparatus of claim 18 in which said means for first transforming includes:
   means for deriving at least one additional file from said sets of line of sight absorption data in which said additional file includes data at a lower resolution than said plural sets of line of sight absorption data,
   means for convolving said stored data as well as said data in said additional file, and
   means for back projecting data from at least one additional file to produce said display representing elemental relative absorption data, said display having a number of elements too few, when considered in relation to said cross-section to produce a display of immediately useful resolution.

20. The apparatus of claim 18 wherein said line of sight absorption data consists of M views, each with N rays, and wherein said means for first transforming includes:
   means for producing an intermediate file having a number of views R, each including S rays, wherein M is greater than R and N is greater than S.

21. The apparatus of claim 20 in which said means for producing includes means for selecting only one view of a first number of views wherein said first number is equal to a ratio of M/R and means for producing S rays per view by summing a second number of adjacent rays of each selected view wherein said second number is a ratio of N/S to produce said S rays of said selected views.

22. The apparatus of claim 21 wherein said R views are evenly distributed among said M views.

* * * * *